US010374730B2

(12) United States Patent
Rainish et al.

(10) Patent No.: US 10,374,730 B2

(45) Date of Patent: Aug. 6, 2019

(54) CALIBRATION TECHNIQUES FOR AN ANTENNA ARRAY

(71) Applicant: SATIXFY UK LIMITED, Farnborough, Hampshire (GB)

(72) Inventors: Doron Rainish, Ramat Gan (IL); Avraham Freedman, Tel Aviv (IL); Dotan Goberman, Ramat Hakovesh (IL)

(73) Assignee: SATIXFY UK LIMITED, Farnborough, Hampshire (GB)

(*) Notice: Subject to any disclaimer, the term of this patent is extended or adjusted under 35 U.S.C. 154(b) by 0 days.

(21) Appl. No.: 16/080,782

(22) PCT Filed: Mar. 7, 2017

(86) PCT No.: PCT/IL2017/050279

§ 371 (c)(1),
(2) Date: Aug. 29, 2018

(87) PCT Pub. No.: WO2017/153984

PCT Pub. Date: Sep. 14, 2017

(65) Prior Publication Data

US 2019/0058530 A1 Feb. 21, 2019

Related U.S. Application Data

(60) Provisional application No. 62/304,352, filed on Mar. 7, 2016.

(51) Int. Cl.

*H04B 17/12* (2015.01)
*H04B 7/06* (2006.01)
(Continued)

(52) U.S. Cl.

CPC ............ *H04B 17/12* (2015.01); *H01Q 3/267* (2013.01); *H04B 7/0417* (2013.01);
(Continued)

(58) Field of Classification Search

CPC ......... H01Q 3/26; H01Q 3/267; H04W 16/28; H04B 7/0617; H04B 7/088; H04B 7/06;
(Continued)

(56) References Cited

U.S. PATENT DOCUMENTS 6,026,304 A 2/2000 Hilsenrath et al.
6,346,910 B1 2/2002 Ito
(Continued)

FOREIGN PATENT DOCUMENTS

DE 3909874 9/1990
EP 2 372 930 A2 5/2011
(Continued)

*Primary Examiner* — Rahel Guarino

(74) *Attorney, Agent, or Firm* — Browdy and Neimark, P.L.L.C.

(57) ABSTRACT

Method and system of calibrating antenna array communication are disclosed. A calibration process is used to obtain signatures by at least one antenna element of the antenna array under idealized operational conditions responsive to a calibration sequence transmitted by at least one other antenna element of the antenna array under, to obtain signatures by the at least one antenna element in an operational state of the array responsive to transmission of the calibration sequence by the at least one other antenna element, to compare the signatures obtained under the idealized conditions and in the operational state, and generate calibration data based thereon.

28 Claims, 8 Drawing Sheets

(51) Int. Cl.

| | |
|---|---|
| ***H04B 17/14*** | (2015.01) |
| ***H04B 17/21*** | (2015.01) |
| ***H04B 17/26*** | (2015.01) |
| ***H01Q 3/26*** | (2006.01) |
| ***H04B 7/0417*** | (2017.01) |
| *H04B 17/00* | (2015.01) |

(52) U.S. Cl.
CPC ........... *H04B 7/0617* (2013.01); *H04B 17/14* (2015.01); *H04B 17/21* (2015.01); *H04B 17/26* (2015.01); *H04B 17/0085* (2013.01)

(58) Field of Classification Search
CPC ........ H04B 17/12; H04B 17/17; H04B 17/21; H04B 17/26; H04B 17/0085; H04B 7/0417
See application file for complete search history.

(56) References Cited

U.S. PATENT DOCUMENTS

| | | | | |
|---|---|---|---|---|
| 6,496,140 | B1 * | 12/2002 | Alastalo ................ | H01Q 3/267 342/174 |
| 6,865,377 | B1 | 3/2005 | Lindskog et al. | |
| 9,130,270 | B1 | 9/2015 | Nelson et al. | |
| 9,628,256 | B2 | 4/2017 | O'Keeffe et al. | |
| 2002/0155818 | A1 | 10/2002 | Boros et al. | |
| 2011/0053646 | A1 | 3/2011 | Kundmann et al. | |
| 2013/0077708 | A1 | 3/2013 | Sorrells et al. | |
| 2013/0180689 | A1 | 7/2013 | Boning et al. | |
| 2016/0049995 | A1 | 2/2016 | Andre et al. | |

FOREIGN PATENT DOCUMENTS

| | | | |
|---|---|---|---|
| WO | 2014/197187 | A1 | 12/2014 |
| WO | 2015/022422 | | 2/2015 |
| WO | 2015/066883 | | 5/2015 |
| WO | 2015/173793 | | 11/2015 |
| WO | 2017/017667 | | 2/2017 |

* cited by examiner

CALIBRATION TECHNIQUES FOR AN ANTENNA ARRAY

TECHNOLOGICAL FIELD

The present invention is generally in the field of array antennas, and particularly relates to the calibration of such antennas.

BACKGROUND

A phased array antenna (PAA, also termed directive/electrically steerable antenna) is an array/matrix of antenna elements in which the relative phases or delays of the respective signals feeding the antennas are set in such a way that the effective radiation pattern of the array is reinforced in a desired direction and, at the same time, it is suppressed in undesired directions. The phase relationships among the antenna elements of the PAA may be fixed, or may be adjustable.

In basic PAA applications RF (analog) signals are delivered to/from the antenna elements through phase shift or time-delay devices configured to affect the desired radiation beam direction. In this way the angles of a directive beam can be instantly set in real time by electronically changing the phase shift of the RF signal of each antenna element. Better control over the radiation patterns can be achieved by simultaneously changing both amplitude and phase of the RF signals of each antenna element, also known as beamforming, used for achieving more general patterns of the formed beam, suppress side lobes, and to create radiation pattern nulls in certain directions.

In order to achieve accurate beamforming it is essential that all of the antenna elements of the PAA be amplitude and phase matched, or to a priori know the gain and phase differences of each antenna element of the array, which must be maintained in demanding environmental conditions over long time periods. Conventionally these goals been achieved using tight tolerance components, phase matched cables and/or factory measured calibration tables. However this is an expensive approach that offers little adaptation to the ambient environmental conditions.

The presence of amplitude and phase errors between antenna elements of the PAA cause distortions in the antenna radiation pattern in terms of beam pointing direction, side-lobe level, half power beam width and null depth. PAA calibration is typically achieved by tight tolerance design with factory determined calibration tables, radiative calibration utilizing internal and external radiating sources, and non-radiative dynamic calibration.

U.S. Pat. No. 6,346,910 describes an automatic array calibration apparatus which is capable of periodically calibrating beamforming offsets using internally generated calibration and test signals. The apparatus preferably includes a calibration signal generating unit which generates a continuous wave calibration signal which is input into a receiving channel as the input signal. I/Q signals are obtained from reception data channels which have been provided with the calibration signal. The apparatus also includes a loop back operation in which test signals are injected in transmission data channels, and are prepared for transmission at a transmission unit. The transmission signal is looped back to the receiving unit and I/Q signals are obtained from reception data channels supplied with the transmission signals.

GENERAL DESCRIPTION

There is a need in the art for PAA calibration techniques that can be conducted in real time and onsite without interrupting, or postponing, data communication scheduled for the PAA. The conventional calibration techniques used nowadays require the use of internal and/or external radiation sources and/or expensive equipment for achieving tight tolerance design goals. The present application provides PAA calibration techniques utilizing off-line signatures generated in sterile environment (laboratory conditions), and on-line signatures generated onsite during normal operation of the PAA. The signatures are a set of recorded signal measurements performed off line and on line and characterize the antenna.

In some embodiments specially designed digital beamforming hardware is used to enable the calibration process to be conducted in the digital domain, and to embed the calibration process into operational modes of the PAA during regular use thereof. This is achieved by storing the digitized off-line signatures in the memory of the system, and conducting the on-line calibration by interleaving in the transmission stream generated during regular operation of the PAA a set of known symbols to be transmitted from each antenna element at a time. The received signatures are processed and compared to the previously recorded off-line signatures, and the calibration data is adjusted whenever needed based on the comparison results.

In some possible embodiments an embedded calibration (compensation and/or correction) process is carried out in a digital beamforming (DBF) circuitry of an array that comprises a plurality of communication modules and a plurality of antennas. A communication module may comprise at least one beam forming unit (e.g., on a chip) and at least one separated RF conversion unit (e.g., on a chip). The process can comprise the following steps:

a) off-line calibration: in this step measurements are performed for each antenna element of the PAA, comprising near-field or far-field measurements of the PAA radiation pattern at different frequencies and scan angles, and signatures that characterize the PAA is accordingly determined;
b) on-line calibration: in this step a calibration waveform is transmitted from one single antenna element of the PAA at a time. The calibration waveform comprises a set of known symbols, that are transmitted in accordance with the operational bandwidth rate, and interleaved with, a transmission stream of the PAA;
c) comparison: in this step the on-line calibration waveform received in step (b) is compared with the off-line signatures determined in step (a); and
d) calibration: based on the results obtained from the comparison in step (c), at least one of the following parameters associated with the PAA is estimated: phase; gain; delay; frequency response and mutual coupling variations, and used to adjust the radiation patterns of the PAA.

Optionally, and in some embodiment preferably, the process comprises a step of correcting impairments in the digital domain (e.g., which are impossible to correct in the analog domain), for example, mutual coupling, non-uniform frequency response, and the like. Thus alleviating the requirements that would otherwise be imposed on the analog domain, and consequently simplifying the antenna array structure.

One broad aspect of the present application relates to a method for carrying out embedded calibration, and/or compensation and/or correction in a digital beamforming (DBF) circuitry of an array that comprises a plurality of communication modules and a plurality of antennas. The method comprise carrying out an off-line calibration process including carrying out measurements for each element of the array as well as near-field or far-field measurements of the array radiation pattern at different frequencies and scan angles, determining a signature that characterizes the array, carrying out an on-line calibration including transmitted from one single element at a time a set of known symbols transmitted in accordance with the operational bandwidth rate and being interleaved with a transmission stream, comparing the received waveform with the determined off-line signature, and based on the comparison results estimating at least one of the following parameters associated with the array: phase, gain, delay, frequency response and mutual coupling variations.

The estimated parameters can be then used for correcting impairments in the digital domain. Optionally, and in some embodiments preferably, the corrected impairments comprise at least one of mutual coupling and non-uniform frequency response. The on-line calibration can be based on analysing the signals received at the receive elements in response to calibration signals transmitted by the transmit elements, or on a feedback conveyed from the output of power amplifier(s) (PA) to the receiving chain at the same element and using a regular transmit signal to carry out the on-line calibration procedure.

In some embodiment the on-line calibration comprises transmitting a signal from one element and receiving signals from all other elements of the antenna array, thereby contributing to relative calibration of the gain phase and time delay of the receiving chains. The on-line calibration can comprise calibrating gain phase and time delay of the transmitting chain, by randomly choosing a transmitting element and comparing the results to other transmitting elements.

The term signal path, or communication path, as used herein refers to the path in which signal passes in the system between one or more antenna elements of the PAA and a signal source or destiny device (modulator or demodulator). In this context the calibration data generated in embodiments disclosed herein is utilized to manipulate data streams passing through such paths in order to correct and/or compensate distortions induced by analog and/or digital components/devices through which the signal passes along the path. The term signature used herein to refer to a set of signals measurements by one or more antenna elements of a PAA responsive to the transmission of calibration sequence(s) from one or more other antenna elements of the PAA, or from one or more external radiation sources.

One inventive aspect of the subject disclosed herein pertains to a PAA communication system comprising an array of antenna elements, at least one digital beamforming circuitry associated with at least one of the antenna elements, and a control unit configured and operable to generate calibration data based on on-line signature received in one or more of the antenna elements during operation of the system, and to modify parameters of one or more elements in the at least one digital beamforming circuitry based on the calibration data to compensate flaws induced in the system due to artifacts in analog or digital portions of the system.

Optionally, and in some embodiments preferably, the system comprises at least one memory device for storing off-line signature received in one or more of the antenna elements of the system under idealized operational conditions. The control unit can be thus configured to compare the on-line signature with at least some portion of the off-line signature stored in the memory device and generate the calibration data based on the comparison results.

In some embodiments the off-line signature are generated responsive to transmission of one or more predetermined signals from at least one of the antenna elements under the idealized operational conditions (e.g., factory/laboratory sterile condition), and wherein the control unit is configured and operable to cause transmission of the one or more predetermined signals from the at least one of the antenna elements during the system operation and record the on-line signature received in one or more of the other antenna elements of the array responsive thereto. Optionally, and in some embodiments preferably, the on-line signatures are received responsive to signals interleaved in a transmission stream of the antenna array during operation of the system without causing interruptions or delays therein.

The at least one digital beamforming circuitry, the control unit, and the at least one memory device, are implemented in some embodiments in a single integrated circuit configured to transmit a data stream in a form of one or more transmission beams generated via the antenna array. The integrated circuit can comprise at least one analog signal path configured to intermediate between the at least one digital beamforming circuitry and at least one of the antenna elements.

A radio frequency front end unit may be used to connect between one or more analog signal paths of the integrated circuit and the at least one of the antenna elements. In some embodiments the radio frequency front end unit comprises at least one signal transmit path, at least one signal receive path, and at least one oscillator. The at least one signal transmit path can use a summation unit to sum together analog signals outputted by the one or more analog signal paths of the integrated circuit, a frequency mixer for shifting the signal outputted by the summation unit to a frequency from the oscillator, and at least one amplifier for amplifying the signal outputted by the frequency mixer. The at least one signal receive path comprises in some embodiments at least one amplifier for amplifying signals received from at least one of the antenna elements, a frequency mixer for shifting the signal outputted by the at least one amplifier to a frequency of the oscillator, and a signal splitting network for delivering the signal outputted by the frequency mixer to one or more of the analog signal paths.

In some embodiments the at least one digital beamforming circuitry comprises a true time delay unit configured to affect a delay to the data stream in the digital domain. The delay affected by the true time delay unit is for causing a phase shift in respective analog signals generated by the system from the data stream. Optionally, and in some embodiments preferably, the delay affected by the true time delay unit is at least partially based on the calibration data. The at least one digital beamforming circuitry comprises in some embodiments at least one of the following units: a digital predistorter configured to adjust the data steam to compensate for nonlinearity in amplification stages of the system based at least partially on the calibration data; a pre-equalizer configured to adjust the data stream to correct non-flat frequency response of an analog channel associated with the digital beamforming circuitry based at least partially on the calibration data; and/or an I/Q compensator configured to adjust the data stream to correct I/Q distortions based at least partially on the calibration data.

The control unit is configured in some embodiments to modify the parameters of one or more of the elements of the at least one digital beamforming circuitry based on the calibration data to compensate at least one of mutual coupling between the antenna element and non-uniform frequency response of the antenna elements.

Another inventive aspect of subject matter disclosed herein pertains to a method of calibrating communication conducted by an antenna array. The method comprises obtaining radiation patterns by at least one antenna element of the antenna array under idealized operational conditions responsive to a calibration sequence transmitted by at least one other antenna element of the antenna array under the idealized operational conditions, obtaining radiation patterns by the at least one antenna element in an operational state of the array responsive to transmission of the calibration sequence by the at least one other antenna element, comparing the radiation patterns obtained under the idealized conditions and in the operational state, and generating calibration data to calibrate the communication based thereon. Optionally, and in some embodiments preferably the transmission of the calibration sequence is interleaved in a transmission stream transmitted in the operational state via the antenna array during regular operation thereof.

A digital beamforming process can be used to manipulate stream of data to be communicated via the antenna array. The method can accordingly comprise using the generated calibration data to adjust the data stream by the digital beamforming process in order to correct errors induced in signals communicated via the antenna array. Optionally, and in some embodiments preferably, the digital beamforming process comprises a true time delay process configured to affect a delay to the data stream in the digital domain at least partially based on the calibration data for causing a delay in respective analog signals communicated via the antenna array. The digital beamforming process can comprise at least one of the following processes: a complex gain process configured to affect a gain and phase shift to the data stream in the digital domain as for causing a gain and phase shift in respective analog signals communicated via the antenna array; a digital predistorter process configured to adjust the data steam based at least partially on the calibration data in order to compensate for nonlinearity in amplification stages used by the antenna array; a pre-equalizing process configured to adjust the data stream based at least partially on the calibration data to correct non-flat frequency response of at least one analog channel associated with the antenna array; and/or an I/Q compensation process configured to adjust the data stream based at least partially on the calibration data in order to correct I/Q distortions of signals communicated via the antenna array.

The method can comprise storing the radiation patterns obtained under the idealized operational conditions in a memory device, periodically or intermittently transmitting the calibration sequence in operational states of the array, and generating the corresponding calibration data to calibrate the communication in a self-calibration manner.

In some possible applications a non-transitory machine readable medium is used for storing instructions executable by a processor for carrying out the method described hereinabove and at least one of the steps/features associated with it.

Yet another inventive aspect of the subject matter disclosed herein pertains to a communication system configured to communicate data streams by one or more beams via an antenna array. The system is configured for self-calibrating communication paths thereof and comprises: a control unit configured and operable to interleave in the communicated streams a calibration sequence for transmission by one antenna element of the antenna array and obtain a radiation pattern responsively received in at least one other antenna element of the array, compare the obtained radiation pattern to one or more off-line radiation patterns similarly obtained by the system during a calibration process, and generate calibration data based on the comparison; and a digital beamforming unit configured to use the calibration data in manipulations applied to the data streams in the digital domain for forming the one or more beams and correcting distortions caused by the communication paths of the system.

The control unit is configured in some embodiments to interleave the calibration sequence in the communicated streams without causing interruptions or delays therein. Optionally, and in some embodiments preferably, the digital beamforming unit comprises at least one of the following units: a complex gain multiplier configured to affect the relative phase shift and gain of the data stream, in the digital domain at least partially based on the calibration data; a true time delay unit configured to affect a delay to the data stream in the digital domain at least partially based on the calibration data; a digital predistorter configured to adjust the data steam to compensate for nonlinearity in amplification stages of the system based at least partially on the calibration data; a pre-equalizer configured to adjust the data stream to correct non-flat frequency response of an analog channel associated with the digital beamforming circuitry based at least partially on the calibration data; and/or an I/Q compensator configured to adjust the data stream to correct I/Q distortions based at least partially on the calibration data.

BRIEF DESCRIPTION OF THE DRAWINGS

In order to understand the invention and to see how it may be carried out in practice, embodiments will now be described, by way of non-limiting example only, with reference to the accompanying drawings. Features shown in the drawings are meant to be illustrative of only some embodiments of the invention, unless otherwise implicitly indicated. In the drawings like reference numerals are used to indicate corresponding parts, and in which:

FIGS. 8A and 8B schematically illustrate on-line onsite calibration techniques of a PAA system according to some possible embodiments, wherein FIG. 8A is a flowchart illustrating a calibration process and FIG. 8B is a block diagram generally showing components of the PAA system;

DETAILED DESCRIPTION OF EMBODIMENTS

Figure 1:
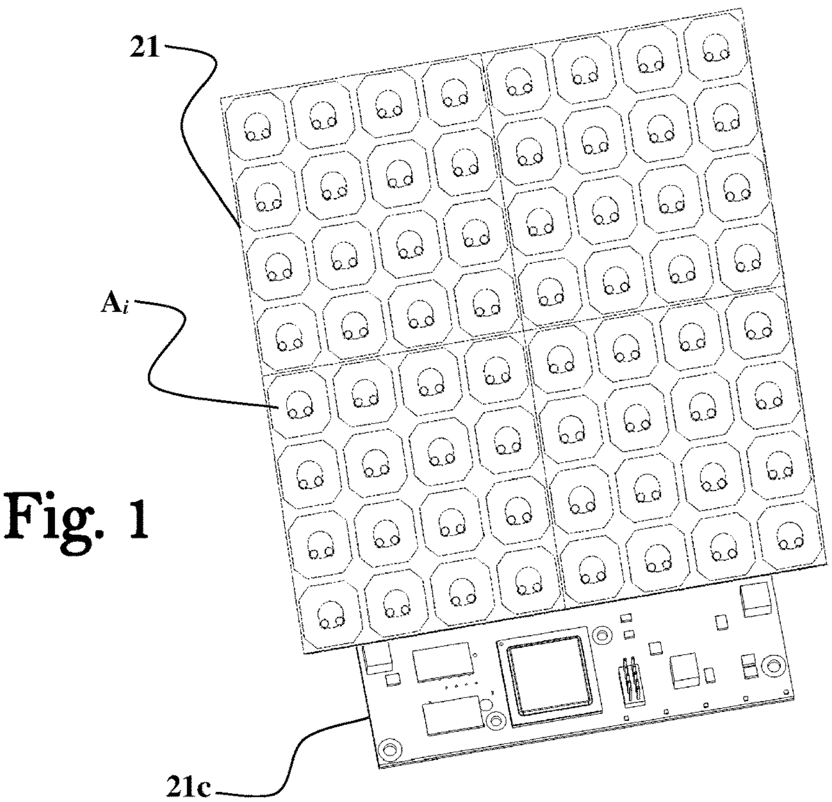
FIG. 1 is a top perspective view of an array antenna and beamforming circuitry used therewith according to some possible embodiments for communication of data streams by one or more beams.

One or more specific embodiments of the present disclosure will be described below with reference to the drawings, which are to be considered in all aspects as illustrative only and not restrictive in any manner. In an effort to provide a concise description of these embodiments, not all features of an actual implementation are described in the specification. Elements illustrated in the drawings are not necessarily to scale, emphasis instead being placed upon clearly illustrating the principles of the invention. This invention may be provided in other specific forms and embodiments without departing from the essential characteristics described herein.

The present application relates to digital calibration techniques for phased array antennas (PAAs) configured for adjusting receive and/or transmit path parameters of the antenna elements during it normal operation, without interrupting or postponing scheduled data communications thereof. Possible applications of the calibration techniques disclosed herein employ a highly integrated circuit (IC)/chip configured to manipulate and shape the signal patterns communicated via the PAA, and characterized by an extremely small size, low power consumption and low cost.

A PAA digital beamforming chip (10 in FIG. 2) constructed in accordance with embodiments disclosed herein allows its integration within a PAA 21, as demonstrated in FIG. 1. In this specific and non-limiting example, the PAA 21 comprises a square array of antenna elements $A_i$ (where $1 \leq i \leq M$ is a positive integer) arranged side-by-side to form matrix shape rows and columns. In this specific and non-limiting example the PAA 21 comprises four antenna matrices, where each array matrix is a 4×4 matrix of 16 antenna elements $A_i$. The PAA is electrically connected to a circuit board 21*c* comprising the PAA digital beamforming chip (10), 16 radio frequency chips (not shown), and circuitries for operating the PAA.

Such design is scalable to meet the required antenna size and number of beams it can simultaneously handle. For example, a PAA having a 256 (16×16) antenna elements array can be similarly constructed from four of the 8×8 PAA 21 units, each having its respective digital beamforming chip (10), radio frequency chips and circuitries for operating the PAA.

It is noted that in possible embodiments the antenna elements $A_i$ can be arranged in other array forms, which are not necessarily of square/rectangular shape or planar. For example, and without being limiting, the antenna elements $A_i$ of the PAA 21 can be arranged to from a round matrix. Additionally or alternatively, the antenna elements $A_i$ of the PAA 21 can be deployed over a non-flat surface and comprised of antenna elements randomly located in space.

Figure 2:
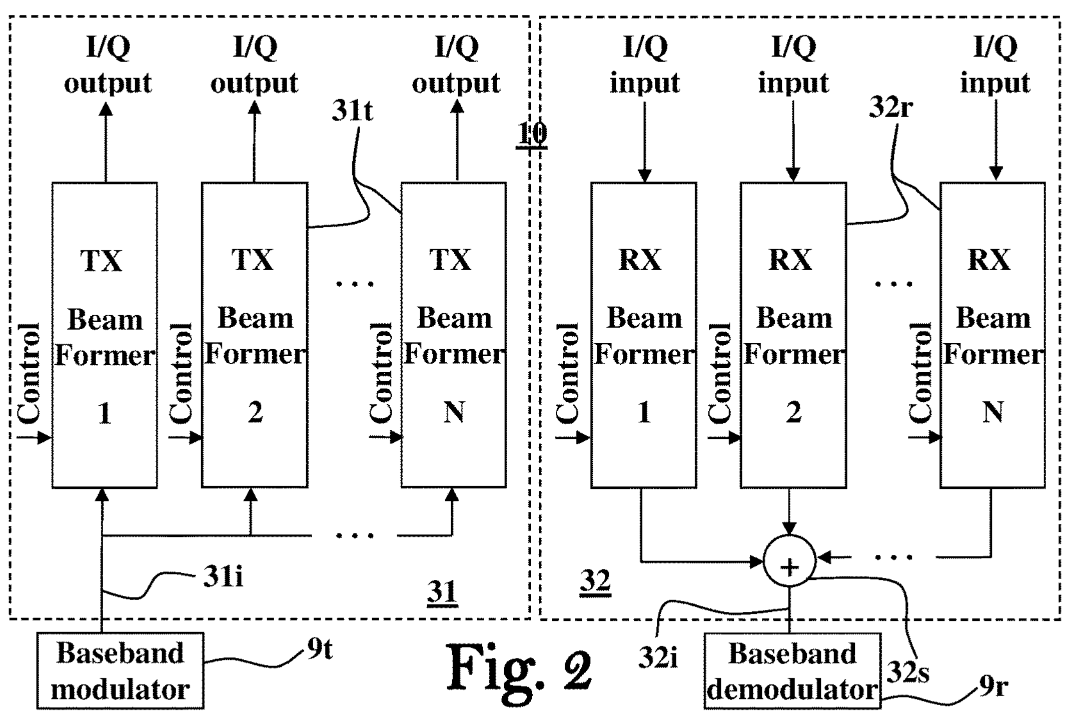
FIG. 2 is a block diagram schematically illustrating the digital beamforming unit according to some possible embodiments.

FIG. 2 schematically illustrates general structure of the digital beamforming chip according to some possible embodiments. The chip 10 comprises a transmitter 31 having a number N (e.g., 16) of transmit (TX) chains, each comprising a transmitter beamforming module 31*t* configured to manipulate the digital data steam 31*i* received from the baseband modem/modulator 9*t*. The digital data input 31*i* to each of the TX chains can be generated by a serial digital interface (e.g., JEDEC JESD204B) configured to feed a common digital data steam to the beamforming modules 31*t* in each of the transmit chains. The output generated by each beamforming module 31*t* is a baseband (I/Q) analogue signal.

The chip further comprises a receiver 32 having a number N (e.g., 16) of receive (RX) chains, each comprising a receiver beamforming module 32*r* configured to manipulate a baseband (I/Q) analogue signal egressing from the antenna elements of the PAA 21. The digital outputs of the receiver beamforming modules 32*r* of all of the receive (RX) chains are summed together by the summation unit 32*s* and outputted via a serial digital interface 32*i* (e.g., JEDEC JESD204B) to a baseband demodulator 9*r*.

Figure 3:
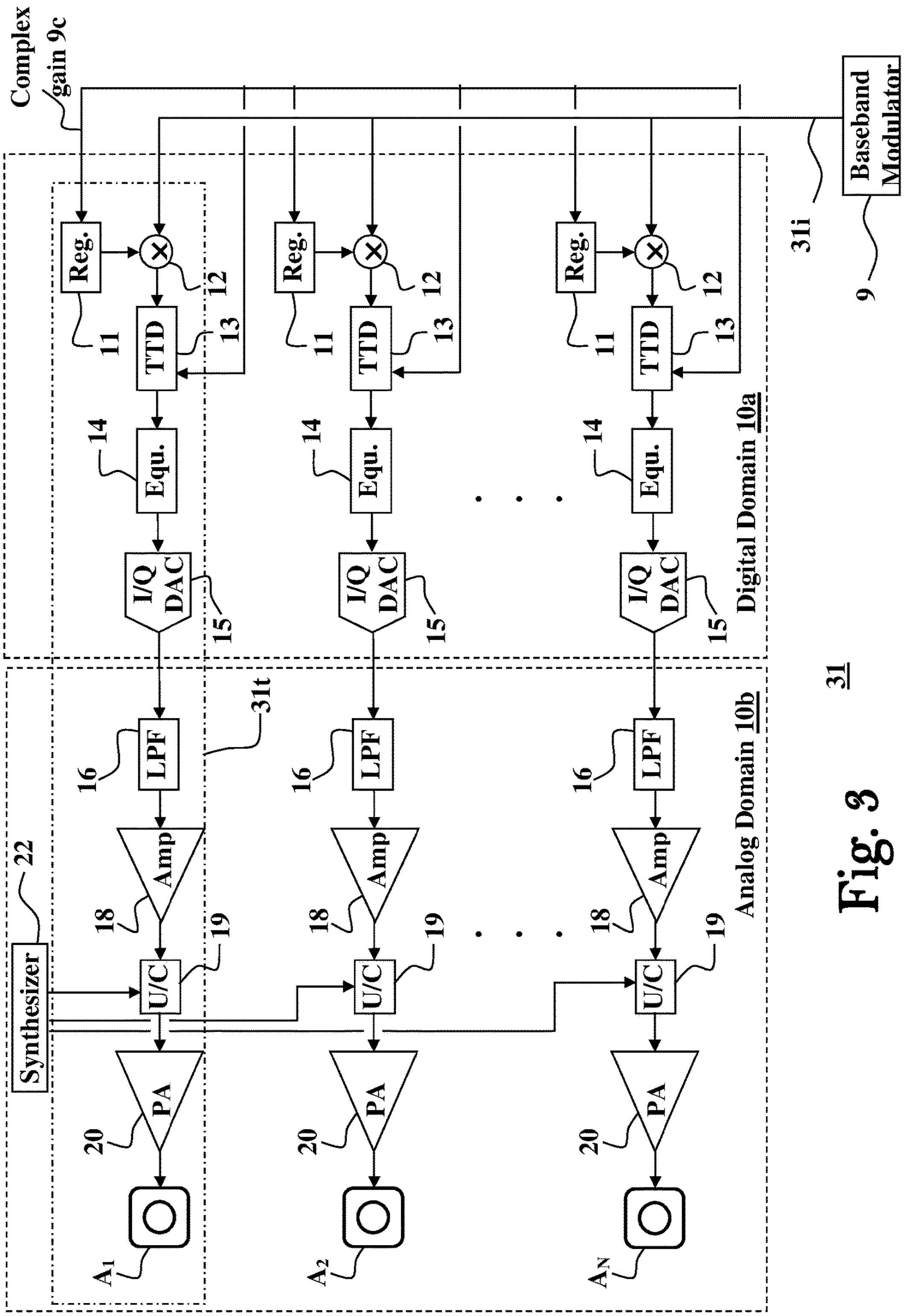
FIG. 3 is a block diagram schematically illustrating digital and analog domain elements of the digital beamforming unit according to some possible embodiments.

FIG. 3 shows a possible structure of the transmit (TX) chains of the transmitter array 31 of the beamforming chip 10, demonstrating the principle of operation and high level architecture of the antenna system for which the beamforming is designed for, according to some possible embodiments. The transmit array 31 comprises N transmitter beamforming modules 31*t*, each comprising a digital domain portion 10*a* (also referred to as digital baseband beamforming channel), and an analog domain portion 10*b*.

In the digital domain 10*a*, each transmitter beamforming module 31*t* receives the data stream 31*i* generated by the baseband modulator 9 encoding waveform signals to be transmitted by the PAA 21. The data stream 31*i* is multiplied in the multiplier 12 by a complex gain 9*c*, stored in the register 11, which contains predefined gain and phase values.

Thereafter, digital true-time-delay (TTD) 13 is applied according to the transmission direction required from the PAA 21. After the TTD 13 the data stream is passed through the digital equalizer 14 configured to compensate the channel fading over the analog transmission path towards the respective antenna element $A_i$. The data stream can optionally undergo an I/Q (in-phase/quadrature) imbalance correction step (not shown). The equalized and corrected signal is then converted into an analog signal by the I/Q digital-to-analog converter (I/Q DAC) 15.

As will be described hereinbelow, in some embodiments on-line calibration of the PAA system is carried out in the digital domain 10*a* of the chip in the TTD 13 and/or in the equalizer 13, in the complex gain factor 12 and in the I/Q correction stage (not shown). As will be also apparent from the following disclosure, the beamforming chip 10, and/or the PAA 21, may comprise in possible embodiments a self-calibration circuitry (not shown).

In the analog domain 10*b* the analog signal from the I/Q-DAC 15 is passed through the low pass filter (LPF) 16, and thereafter optionally pre-amplified by the Amp 18, and converted by the up-converter (U/C) 19 using the local oscillator frequency received from the synthesizer 22. The up-converted signal is then amplified by the power amplifier (PA) 20 and transmitted via the respective antenna element $A_i$. In some embodiments the frequency conversion is carried out in stages, for example, by converting the analog baseband signal into an intermediate frequency (IF), and thereafter converting the analog IF signal into the actual radio-frequency (RF) of the communication transmission.

It is noted that the structure of the receiver (32 in FIG. 2) is very similar to the transmitter array 31, albeit reverse signals' directions.

Figure 4:
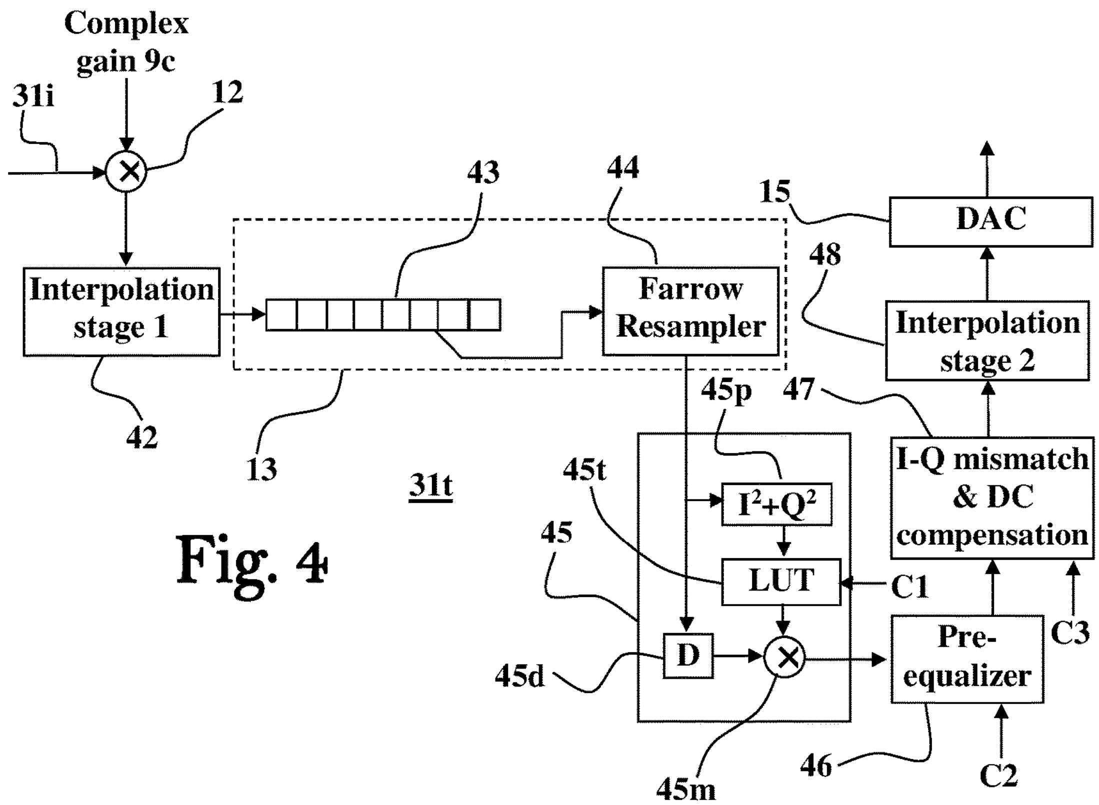
FIG. 4 is a block diagram schematically illustrating digital true time delay circuitry and digital signal correction components of the digital transmit beamforming components according to some possible embodiments.

FIG. 4 schematically illustrates the inner structure of a TX beamforming module 31*t* in the digital domain portion (10*a*), according to possible embodiments. The input data stream 31*i* to the beamforming is a stream of I (in-phase) and Q (quadrature) digitized samples of the modulated baseband signal. The received data stream 31*i* first undergo gain and phase correction suitable for a selected central frequency, by the basic multiplier 12 and the complex gain 9*c*. After the signal correction step, the interpolator 42 is used to increase the sampling rate of the data stream, which is then passed through the TTD circuit 13 comprising the shift register 43 and the re-sampler unit 44.

The shift register 43 is used to apply delays that are integer multiplications of the sampling time, and the re-sampler 44 is used to apply delays that are smaller than sampling rate. In this specific and non-limiting example a Farrow re-sampler is used to apply the delays that are smaller than the sampling time, but other suitable re-sampling technique may be used instead. A digital pre-distortion unit 45 is used here to compensate for nonlinearity of the amplifier(s) in the analog domain (10*b*), by amplifying, attenuating or adjusting the phase of each of the I/Q samples by a complex factor derived from the original amplitude of the samples via a lookup table (LUT). Particularly, each I/Q sample received in the predistorter 45 is stored in a delay unit 45*d* configured to input the I/Q sample to the multiplier 45*m* after a corresponding correction factor is derived by the LUT 45*t* based on an amplitude of the I/Q sample, as derived by the amplitude determining unit 45*p*. The I/Q sample stored in the delay unit 45*d* is then modified by the multiplier 45*m* based on the corresponding correction factor outputted by the LUT 45*t*.

The amplitude determining unit 45*p* can be configured to determine the amplitude of a sample based on quadratic values of the in-phase ($I^2$) and quadrature ($Q^2$) components of each sample. Optionally, and in some embodiments preferably, an on-line amplification calibration data C1 is used to adjust the values recorded in the LUT 45*t* to compensate for amplification distortions detected during regular use of the system, and which were not considered/present during the initial (off-line) calibration of the system.

More particularly, the values of the LUT 45*t* are typically determined for each beamforming chip system based on off-line calibration values obtained during the system manufacture under sterile laboratory conditions. Thus, the values recorded in the LUT 45*t* may become inaccurate to some degree over time as the system is being used in the field under varying environmental conditions. As such variations affect the nonlinearity of the amplification stages, the online calibration technique disclosed herein is used to detect deviations from the original amplification curves of the system and generate corresponding amplification calibration data C1, as may be needed, to correct the deviations from the original amplification curves.

A pre-equalizer unit 46 is then used to correct/adjust non-flat frequency response of the channel in the analog domain (10*b*). The pre-equalizer unit 46 is configured to compensate for the non-flat channel frequency response as detected during the original off-line calibration of the system during the system manufacture, and thus may not be able to compensate the channel frequency response deviations that typically occur over time during continuous use of the system under varying environmental conditions. Thus, in some embodiments, a channel calibration factor C2 is used in some embodiments to adjust the pre-equalizer unit 46 according to online calibration data generated by the system during its use.

After the pre-equalization, an I/Q mismatch and DC compensation stage 47 is applied to resolve I/Q imbalances. In some embodiments I/Q calibration factor C3 is received and used in the I/Q mismatch and DC compensation stage 47 to compensate for any I/Q distortions that may be detected in the online calibration process.

Next, the sampling rate of the samples is matched to the rate of the DAC 15 by means of another interpolation stage 48. Thereafter, the digital to analogue converter 15 converts the signal samples to the analogue domain.

Alternatively, samples of a single signal at intermediate frequency (IF), converted previously digitally by the modulator (9) can also be applied. In this case the I/Q mismatch unit 47 is not required and can be omitted, and the complex gain (9*c*) would be implemented as a variable gain plus a phase shifting element. The following formulas exemplifies an implementation of the complex gain in form of a variable gain and phase shifting elements for some signal A(t):

$$s(t)=A(t)\cos(2\pi ft+\phi(t))=Re\{A(t)\exp\ [j2\pi ft+\phi(t)]\}$$

in complex representation (dropping A and ϕ dependence on t), this becomes:

$$A\ \exp(j2\pi ft+\phi)=A\ \exp\ \phi\ \exp(j2\pi ft)=C\ \exp(j2\pi ft)=(C_I+jC_q)[\ \cos(2\pi ft)+j\ \sin(2\pi ft)]=[C_I \cos\ 2\pi ft-C_q \sin(2\pi ft)]+j[C_q \cos(2\pi ft)+C_I \sin(2\pi ft)]$$

Typically for the same signal, I/Q implementation requires two paths with a given sample rate, while the intermediate frequency (IF) implementation would require a single path albeit with at least double the sample rate.

Figure 5:
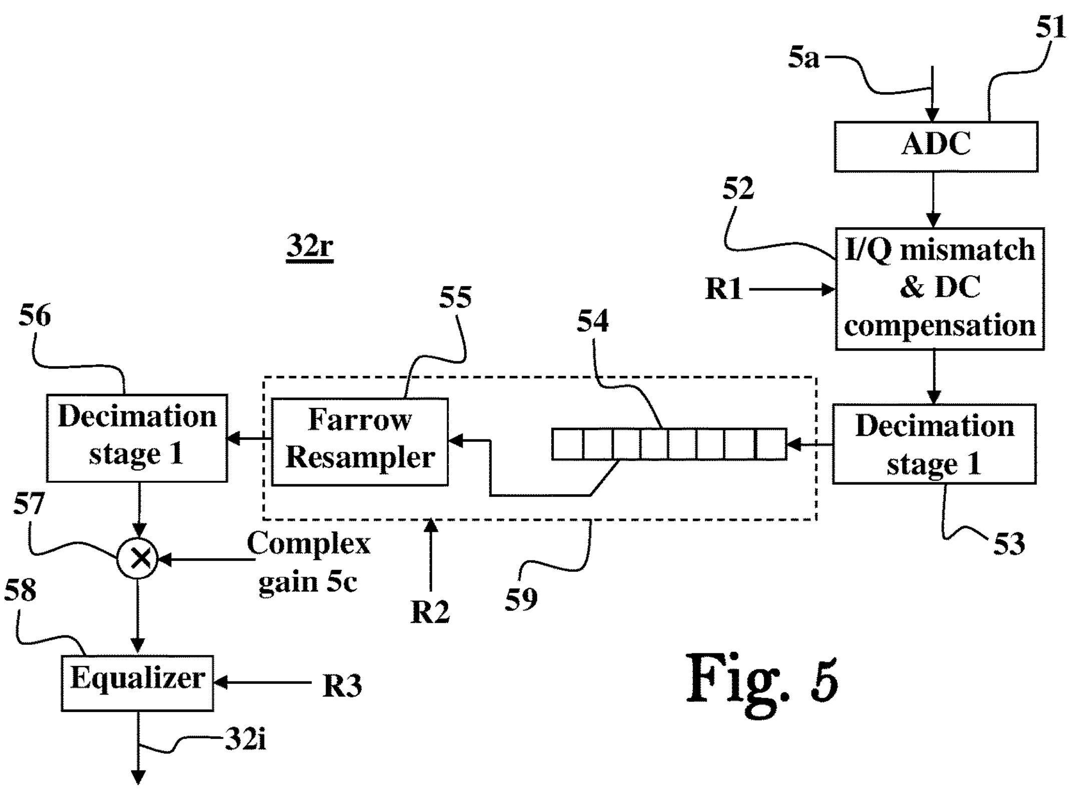
FIG. 5 is a block diagram schematically illustrating digital true time delay circuitry and digital signal correction components of the digital receive beamforming components according to some possible embodiments.

FIG. 5 schematically illustrates the inner structure of a RX beamforming module 32*r* in the digital domain portion (10*a*), according to possible embodiments. The analog signals 5*a* egressing from an RF chain connected to an antenna element $A_i$ is sampled, (after amplification and down-conversion in the RF front end) by the analog-to-digital converter (ADC) 51, and the sample signals then undergo an I/Q mismatch correction and DC compensation in unit 52 to resolve I/Q imbalances. A decimator 53 can then be used in order to reduce the sampling rate of the incoming signal. The signals samples are then passed through the true time delay circuitry 59 comprised of the shift register 54 and the Farrow resampler 55. A decimation stage 56 may be then used to further reduce the sampling rate. The signal samples are then subject to gain and phase correction suitable for a selected central frequency, by the multiplier 57 and the complex gain 5*c* (a complex gain and an equalizer, similar to the one presented in the TX beamforming). An alternative IF implementation is also possible.

Optionally, and in some embodiments preferably, the I-Q mismatch correction and DC compensation unit 52 is configured to receive and use an on-line calibration factor R1 for correcting I/Q distortions identified in the on-line calibration process. The true time delay circuitry 59 is configured in some embodiments to receive and use an on-line calibration factor R2 for adjusting the delay applied over the signal samples to compensate any phase shift that may be introduced by the receiver amplifying stage (not shown) and detected by the online calibration process. Additionally or alternatively, the equalizer 58 is adapted to receive and use a calibration factor R3 for compensating for deviation of the receiver channel frequency response detected by online calibration process.

Optionally, and in some embodiments preferably, the receive path calibration factors C1, C2 and C3, and transmit path calibration factors R1, R2 and R3, comprise factory (off-line) calibration factors and online calibration factors determined during the continuous operational use of the system.

Figure 6:
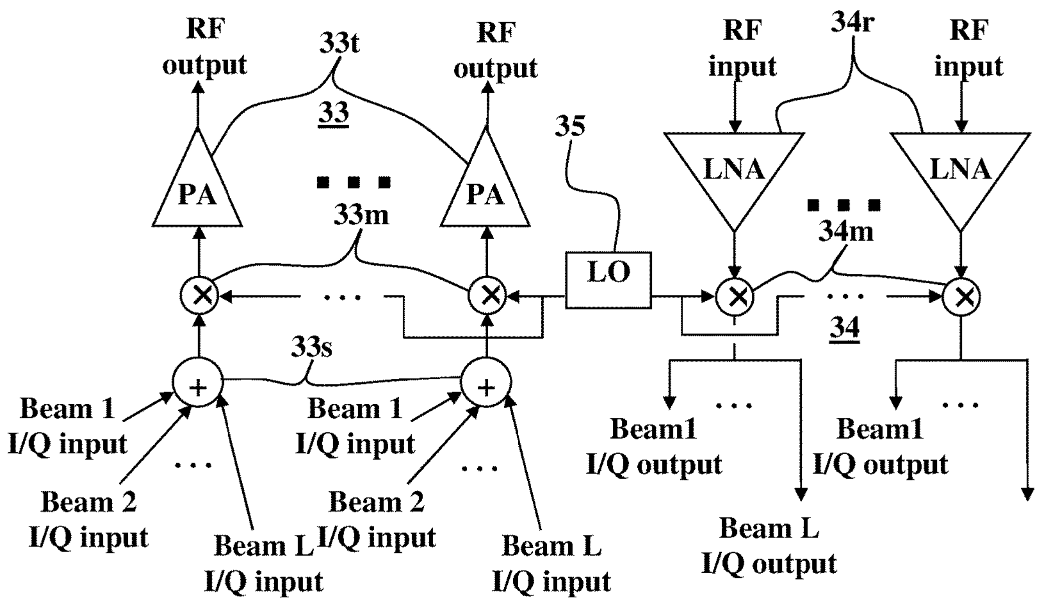
FIG. 6 is a block diagram schematically illustrating a radio frequency front end usable according to some possible embodiments for coupling between the beamforming circuitry and the antenna element.

In some embodiments the beamforming chip 10 is connected to a radio frequency (RF) Front end (RFE) comprising a transmit RFE 33 and a receive RFE 34, as illustrated in FIG. 6. The transmit RFE 33 comprises a plurality of transmit channels, each comprising a summation unit 33*s* for summing I/Q signals outputted by the transmitter 31 of the beamforming chip 31, a frequency mixer 33*m* configured to shift the frequency of the summed signals to a carrier frequency generated by the local oscillator (LO) 35, and a power amplifier (PA) 33*t* for transmitting the signals produced by the frequency mixer 33*m* via a respective antenna element(s). The receive RFE 34 comprises a plurality of receive channels, each comprising a low noise amplifier (LNA) 34*r* for amplifying signals received via a respective antenna element(s) and a frequency mixer for shifting the frequency of the received signals to a frequency (e.g., IF) generated by the LO 35, where the frequency shifted signal generated by the mixer 34*m* is split into a plurality of analog I/Q signals fed to the receiver 32 of the beamforming chip 10.

The chip set may also be connected and chained, to enable its use in multibeam operation and/or in larger arrays. As will be appreciated by those skilled in the art, the separation referred to is not necessarily a physical separation, but rather a conceptual one. In other words, the elements of the RFE may be implemented as part of the beamforming chip 10 on a single die. Alternatively, the components of the beamforming chip 10 may be implemented on a different die.

The RFE comprises a plurality of TX paths and a plurality of RX paths (e.g., 16), as depicted in the example of FIG. 6. A TX path may comprise in some embodiments two reconstruction Low Pass Filters (LPFs), a direct up converter from I-Q (or IF) to the required frequency band, a Variable Gain Amplifier (VGA), and a Power Amplifier (PA). Possibly, certain RF filtering might also be required. A RX path may comprise in some embodiments a Low Noise Amplifier (LNA), a VGA, direct down converters from the desired frequency to I-Q (or IF), two anti-aliasing filters that are preferably used before a signal sampler, to restrict the bandwidth of a signal. Here again, a certain RF filtering might also be required. The local oscillator (LO) system demonstrated in this figure comprises two Phase Locked Loops (PLLs), namely an RX and a TX which are locked to an external synthesizer. A RX/TX switch (not shown in this figure) is used for each of the RX/TX pairs (e.g., 16) depending on whether that RX/TX pair is currently in a transmitting mode or in a receiving mode.

Array Scalability

In some embodiments there is provided a scalable system that comprises baseband digital beamforming chips (BF chips) and separated RF conversion chips (RFE chips), essentially connected via a simple baseband analogue interface. As a result, using two basic building blocks, the configuration enables, both on the transmit side as well as on the receive side, to construct large arrays having a large number of antennas and the formation of separate beams operating simultaneously (multi-beam configuration).

Thus, the size of the array may be enlarged by using a required number of the RFE building blocks. If a larger number of beams is to be supported, BF chips can be added to provide the necessary signal processing for each of the beams. The connection between the building blocks is simple and can be easily extended as necessary, for example, and without being limiting, the connection between the blocks can be either achieved by simple analog connection between the block, or it may be achieved via the serial digital data bus. On top of that, there are no constraints in the design of any of the building blocks themselves as a function of the actual array size or the number of beams Additionally, the digital compensation circuitry included in the embodiment make it possible to correct for various impairments and errors inherently present in a construction of such arrays, as is known to those skilled in the art. This capability makes it possible to alleviate the requirements and hence the cost of the array itself. A typical example is the case of cable and connection path lengths to the antenna elements within an array, which in traditional design need to be equal to each other with a very small tolerance, whereas such difference can be compensated digitally using the true-time delay circuitry described hereinabove.

Figure 7:
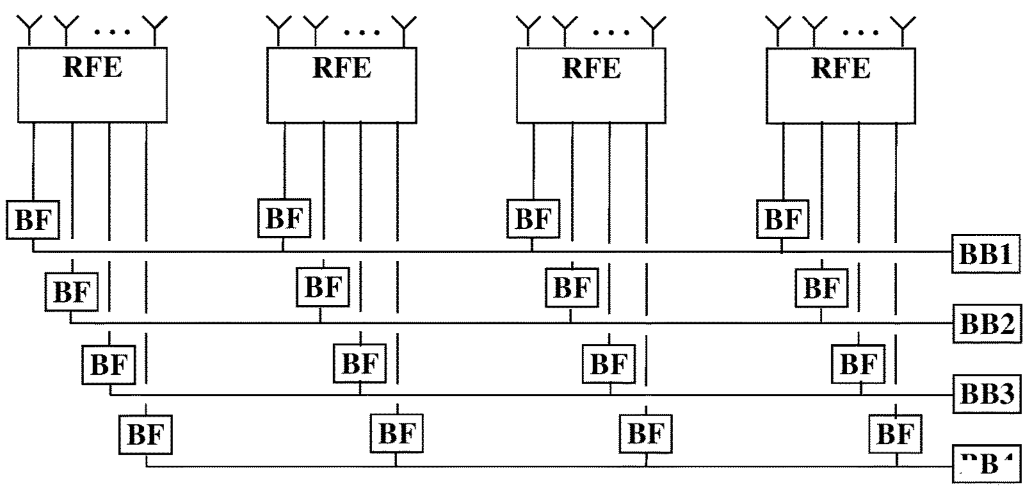
FIG. 7 is a block diagram schematically illustrating a communication system utilizing a plurality of a beamforming circuitries to communicate data streams in one or more beams through a plurality of antenna arrays according to some possible embodiments.

FIG. 7 exemplifies possible connections that are used to form a four beam, 64 antenna element array, using the beamforming chips BF (10), each supporting a single beam and 16 antenna elements, and RF chips, each supporting 16 antenna elements as well. 16 beamforming BF chips are deployed in this configuration that requires four RF front end RFE chips. On the transmit side, the modulated digital signal is formed by the baseband modulators BB1, BB2, BB3 and BB4. In some embodiments each output is chained (via SerDes, e.g., JEDEC JESD204B) to four beamforming chips. The outputs of the beamforming BF chips that belong to a given group of 16 elements, are summed by a RF front end chip to drive the antenna elements. It should be noted that the summation in this example is an analog summation performed in the baseband. However, digital summation within the BF chips, which are daisy chained to each other is also possible.

On the receive side, the antenna outputs of each group of antenna elements are distributed among all the BF chips that support the elements that belong to that group, where each of these elements is configured to provide the relevant digital output resulting from the proper summation of the elements outputs. The outputs of the BF chips belonging to the same beam are chained to each other and summed to form the beam baseband chip input. The distribution can be made in either the analog domain or in the digital domain The beamforming chip 10 used in embodiments of the present application is typically calibrated in the sterile/laboratory conditions to compensate for nonlinearity of the amplification stages, and the imperfections of the analog receive and transmit paths. However, during normal use in field conditions the operation of various elements of the system is effected due to the changing environmental conditions, continuous wear of system elements, and physical displacements of the antenna and channel elements in the system. There are various sources of system changes/imperfections that can occur along continuous use of the system, that induce errors into the receive and transmit paths of the system. To name but few, such sources might be element manufacturing tolerance and misalignment, mutual coupling among elements that might result in different radiation patterns for central and edge elements, gain and phase variations of the power amplifiers among elements and over frequency and input signal level, phase variations of LO between elements, I/Q DC-offset, phase and gain mismatch between channels, connections mismatches as well as different path lengths and non-linear characteristics of the power amplifiers. On the digital side, quantization might also be a source for errors. In addition, at least some of the above parameters might vary as a function of temperature, manufacturing variances and operation conditions.

The solution in some possible embodiments distinguishes between off-line calibration procedures and on-line calibration procedures. The off-line calibration procedures include calibrations that are performed during manufacturing and validation phase, whereas the on-line calibration refers to array monitoring procedures which are applied during the array deployment phase by determining one or more array radiation patterns (also referred to herein as signatures) during operational use of the system, and comparing to array radiation patterns recorded in the off-line calibration stage under similar conditions. The array radiation patterns can be determined by the element radiation pattern, as well as by the input signal gain, delay and phase, for each element at each frequency.

The off-line calibration procedures include specific measurements that are carried out for each antenna element and near-field or far-field measurements of the array pattern at different frequencies and scan angles. A calibrated array should then undergo a "signature" recording that will be used in the on-line stage.

Optionally, and in some embodiments preferably, during the off-line calibration process each element is checked at least for the following:

- Element radiation pattern, to be performed within an antenna range. The pattern is to be measured for each element that belongs to the array, while all other elements are either turned off or transmit a zero signal. Measurements should be made across a pre-defined frequency range.
- Gain and phase response of the RF Front end (RFE) chips, preferably at both, the linear and non-linear range of operation, over the pre-defined (e.g., the entire operational) frequency range.
- Local oscillator distribution tree accuracy. This includes measurements of delay, phase and gain of the LO input to each RFE.
- Each DAC output should be calibrated for minimal I/Q mismatch and offset.

The results of these off-line measurements may be provided in a form of a calibration table for each scanning angle, which would include gain, phase and group delay correction for each one of the elements.

The array should then be tested within an antenna range using the per-element calibration table derived in the previous stage. Tests should be made for all required scan angles, operational frequency range and operation temperatures. The calibration tables and internal components are preferably adjusted at this stage.

After conducting the off-line calibration procedures the system practically becomes operational, and after it is installed for normal use it can be calibrated from time to time, or periodically, by carrying the on-line calibration procedure and comparing the obtained array radiation patterns to the off-line array radiation patterns recorded in the system. The main objects of the on-line calibration procedures are to confirm that all of the antenna elements are correctly operating and to modify the calibration table when required, according to the varying operational conditions.

In some embodiments the on-line calibration is based on analysing the signals received at the receive elements in response to calibration signals transmitted by the transmit elements. In case of transmit-only or receive-only array, a single receive (or transmit) element located in front of or at the antenna array plane may be used. In any case, the location of the calibration receiver should be fixed and calibrated during the off-line calibration stage. Other option of calibration may include using a feedback conveyed from the output of the PA (by directional coupler or some other means) to the receiving chain at the same element, and using the regular transmit signal to carry out a calibration routine, which enables calibrating the PA as it transmit high power.

Transmitting from one antenna element of the PAA and receiving from all the other elements of the PAA contributes to relative calibration of the gain phase, time delay, and frequency response of the receiving chains. By randomly choosing the transmitting antenna element and comparing the results to those of other transmitting elements, the transmitting chain gain phase and time delay may be calibrated. The location of the transmitting element needs to be considered.

Optionally, and in some embodiments preferably, the on-line calibration comprises interleaving a calibration waveform during operation of the system with the transmission stream conducted by the PAA system. The calibration waveform is transmitted from one single antenna element at a time, comprising a set of known symbols that are transmitted in accordance with the operational bandwidth rate of the system. The waveform received by all other antenna elements of the PAA is then compared to a "signature" waveform, recorded during the off-line calibration stage. Based on the comparison results phase, gain, delay, frequency response and mutual coupling variations can are estimated, corresponding compensating on-line calibration data is generated and entered into the calibration table of the system.

As the calibration receiver in such on-line calibration procedures is located close to the transmitting antenna elements, the signal to noise ratio (SNR) in the reception is expected to be sufficiently high to guarantee that the measured parameters are accurately determined and effectively limited by the quantization noise. In some embodiments a complete on-line calibration cycle of a PAA comprising 256 antenna elements is completed within 128 ms, assuming a super-frame of 0.5 ms (for 1 Gsps transmission). It is assumed that variations of the parameters are affected by temperature variations, however, the latter are assumed to be at a much lower rate.

Figure 8A:
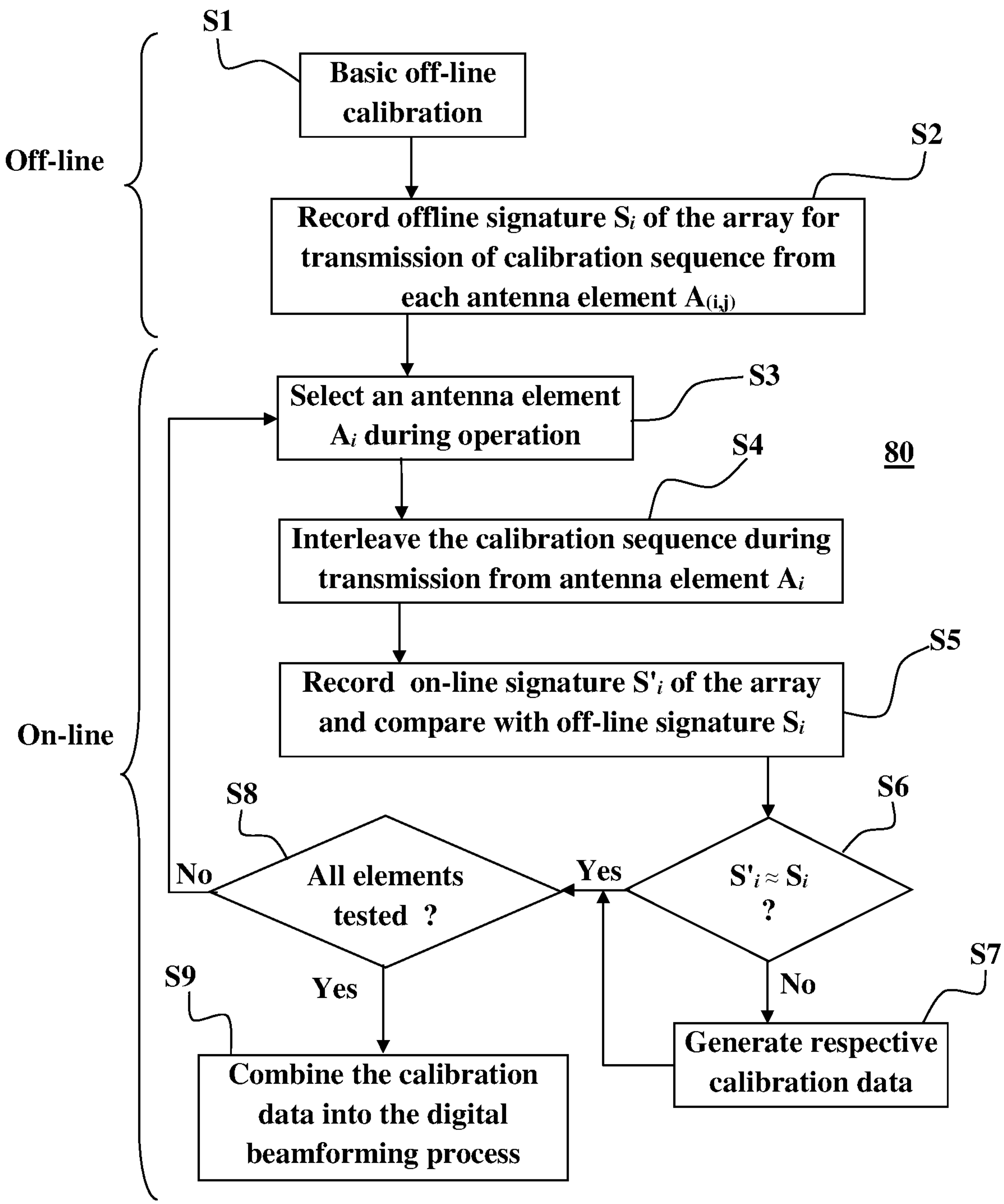

FIG. 8A shows a flowchart 80 schematically illustrating system calibration according to some possible embodiments. In step S1 basic off-line calibration is carried out in factory/laboratory conditions to compensate for gain and phase distortions induced by the various elements of the system. Following the basic calibration procedures of step S1, in step S2 radiation signatures are generated for each and every antenna element of the PAA, and recorded in system memory. Optionally, and in some embodiments preferably, a radiation signature is generated for each antenna element $A_i$ of the PAA by transmitting therefrom a predefined sequence of symbols while in the factory/laboratory conditions, and recording the radiation waveforms received in each of the other antenna elements $A_i$ (where $1 \leq j \leq M$ and $j \neq i$ is a positive integer) of the PAA responsive to the transmission of the predefined sequence of symbols. The off-line signatures can be generated for various different transmission frequencies e.g., defined within a nominal frequency range of the system.

The following steps S3-S9 are typically performed during normal operation of the system under field conditions. In step S3 an antenna element $A_i$ of the PAA is selected, and in step S4 the predetermined symbol sequence is transmitted from the selected antenna element $A_i$, at the same frequency (or at least one of the frequencies) used for generating the off-line signatures in step S2. The radiation waveforms received in all other antenna elements $A_j$ (where $1 \leq j \leq M$ and j≠i is a positive integer) responsive to the transmission of the predetermined symbol sequence are then determined as a respective on-line signature $S'_i$ of the antenna element $A_i$. Optionally, and is some embodiments preferably the transmission of the predetermined symbol sequence from the selected antenna element $A_i$ is interleaved in the transmission stream generated by the system during regular operation of the PAA system.

In steps S4-S5 the determined on-line signature $S'_i$ is compared (e.g., by cross-correlation) with the respective off-line signature $S_i$. If it is determined in step S6 the on-line and off-line signatures are substantially different, in step S7 the identified differences are analysed and respective on-line calibration data is generated for rectifying any deficiencies evolving in the elements in the transmit path of the selected antenna element $A_i$, and/or in the receive path of one or more (or all) of the other antenna elements $A_j$. Step S8 determines if further on-line calibration signatures are needed for any of the other antenna elements of the PAA.

If it is determined in step S8 that additional on-line signatures are needed, the control is passed back to step S3 for selecting a new different antenna element for the transmission of the predetermined symbol sequence and testing its off-line and online signatures. Otherwise, if it is determined in step S8 that there is no need for additional on-line signatures, in step S9 the calibration data generated is used in the digital beamforming stages of the chip 10 to apply impairments and corrections to any deficiencies evolving in the receive and/or transmit paths of the system.

In some embodiments the on-line calibration data comprises one or more of the following parameters: gain, phase, delay, equalizer taps value, DC offset and I/Q mismatch and digital pre-distortion of the amplifiers. The on-line calibration data can be stored in a memory of the system and applied to the array system for different operation conditions. Various calibration means can be used in the digital domain of the chip design to affect correction of a large variety of impairments, such as, but not limited to, a digital pre-distortion unit, a pre-equalizer unit, an I/Q mismatch correction and a DC compensation unit. Optionally, calibration values can be programmed to enable carrying out corrections for such errors that will occur in the chain, in addition to the basic gain, phase and delay values used by the system.

It should be understood that throughout this disclosure, where a process or method is shown or described, the steps of the method may be performed in any order or simultaneously, unless it is clear from the context that one step depends on another being performed first.

Figure 8B:
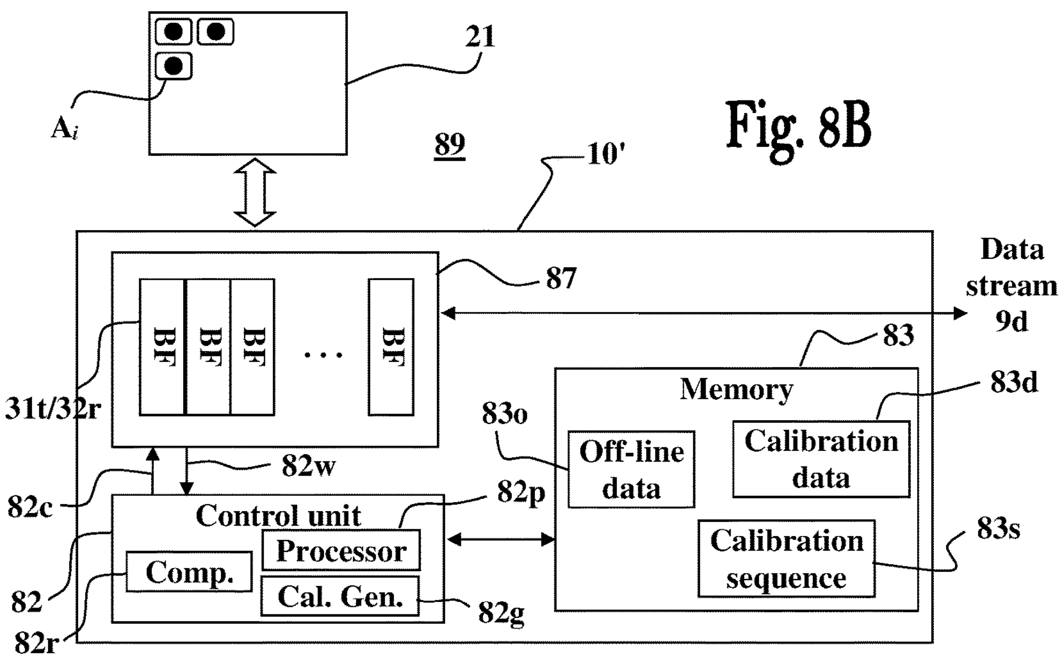

FIG. 8B is a block diagram of a PAA system 89 according to some possible embodiments. The PAA system 89 comprises an array 21 of antenna elements $A_i$ electrically coupled to the beamforming chip 10' configured to transmit or receive the data stream 9*d* in a form of one or more beams via the antenna array 21. The beamforming chip 10' comprises a digital beamforming unit 87 comprising a plurality of the digital beamforming units 31*t*/32*r* (shown in FIG. 2), a control unit 82, and a memory unit 83.

The control unit 82 is configured and operable to provide calibration data 82*c* to the digital beamforming unit 87, receive radiation waveforms data 82*w* from the digital beamforming unit 87, and optionally operate the digital beamforming unit 87. The memory unit 83 comprises off-line radiation waveforms data 83*o*, calibration data 83*d*, and in some embodiments also the sequence of calibration symbols 83*s* used to generate on-line radiation waveforms 82*w* and the off-line radiation waveforms 83*o*.

The control unit 82 is configured and operable to operate the beamforming unit 87 to transmit the calibration sequence 83*d* via one or more of the antenna elements $A_i$, and receive from the beamforming unit 87 corresponding radiation patterns 82*w* generate in response to the transmission of the calibration sequence 83*d*, compare the received radiation patterns 82*w* to one or more of the off-line radiation patterns 83*o*, and generate corresponding calibration data 82*c* based on the comparison results and provide the same to the digital beamforming unit 87 for on-line calibrating various elements thereof. Optionally, and in some embodiments preferably, the control unit 82 is configured to interleave the transmission of the calibration sequence 83*d* in the transmission stream generated during regular operational use of the system 89, without causing any interruptions or delays therein.

Accordingly, in some embodiments the control unit 82 comprises one or more processing units 82*p*, a comparator module 82*r* configured to compare the on-line radiation waveforms 82*w* received from the digital beamforming unit 87 with the off-line radiation waveforms 83*o* stored in the memory 83 (e.g., by cross-correlation), and a calibration data generation module 82*g* configured to analyze the comparison results from the comparator module 82*r* and generate new calibration data 82*c* based thereon. The calibration data generation module 82*g* can be further configured to provide the new calibration data 82*c* to the digital beamforming unit 87 for adjusting operation of its digital components and/or to update the calibration data records 83*d* stored in the memory device 83.

The use of relatively very large antenna array that can be scaled per user's needs, as described hereinabove, enables construction of a fully adaptive and steerable antenna system at a very low cost, weight and power consumption. This fact makes the system disclosed herein a viable solution in a variety of applications. Following are some of the possible applications. In some embodiments the beam forming chip 10/10' is configured to carry out beam forming/steering in the digital domain (TTD) for a 16 elements' flat antenna (4×4), which can be provided as a small antenna module incorporating the chip 10/10' described hereinabove. Such embodiments can be used for various different implementations, such as, but not limited to, machine to machine (M2M) (i.e., direct) communication between devices and internet of things (IoT), as described hereinbelow.

Internet of Things ("IoT")

The evolution of the Internet and the pervasive availability of communications means makes this possible to integrate various types of devices ("everything"), namely sensors, appliances, meters, security cameras and others, into a single network. This is true mainly in urban and densely populated areas where coverage of cellular systems and wireless local access networks (WLAN, Wi-Fi) is ubiquitous. In rural areas, satellites can provide the missing coverage and connect sensors and other entities to the Internet. This is applicable to areas such as agriculture, water metering, weather sensors, petrol and gas metering and the like.

The PAA described above, being of low cost and of low power consumption can be used as an antenna for IoT terminals that would make it possible for them to find, acquire and track the designated satellite automatically. This in turn provides the terminal with self-installation and tracking capabilities, which highly reduces installation costs. It also enables operating mobile applications.

Figure 9:
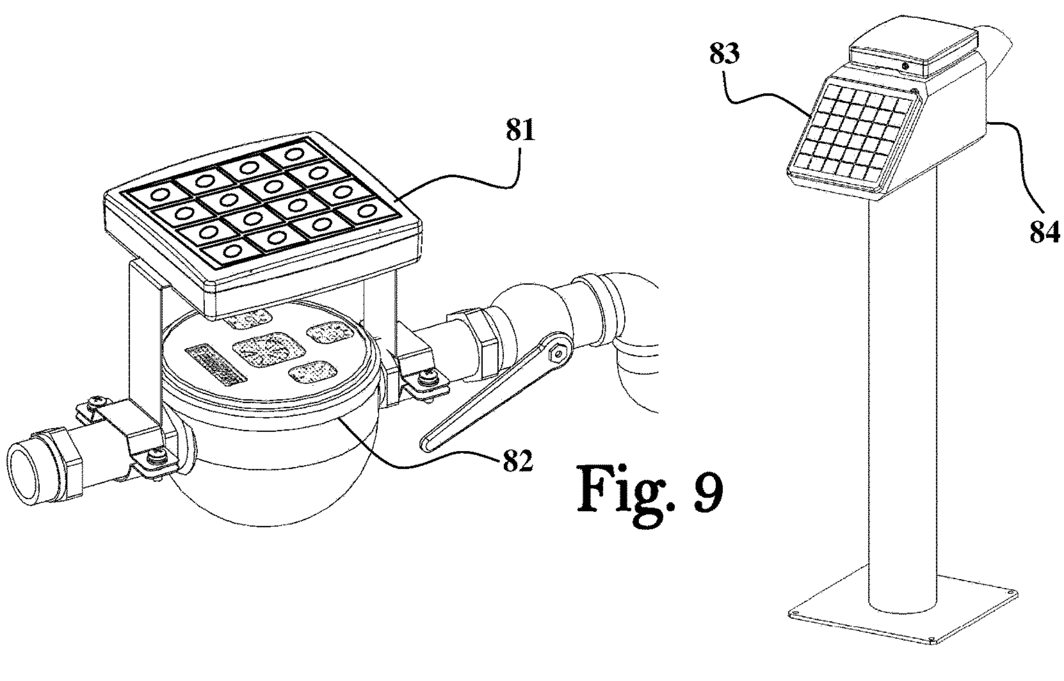
FIG. 9 demonstrates possible applications utilizing the PAA system according to some possible embodiments.

An example for such terminals, is illustrated in FIG. 9, presenting a terminal 81 connected to water meter 82 and another terminal 83 connected and to a gas meter 84, where both terminals are in communication with a satellite (not shown).

It should also be noted that the use of a small antenna size in these cases is possible due to the use of appropriate waveforms, as described in international patent publication No. WO 2017/017667, of the same applicant hereof and entitled "a method and device for operating under extremely low signal to noise ratio", which is hereby incorporated herein by reference. Low power consumption for such terminals can be supported by waveforms using a method as described in international patent publication No. WO 2015/173793 "a method of exchanging communications between a satellite and terminals associated therewith", of the same applicant hereof, that is hereby incorporated herein by reference, which can be combined with ELSNR waveforms in order to utilize the low duty cycle in which those terminals are expected to operate.

Payload for Small Airborne Platforms

Figure 10:
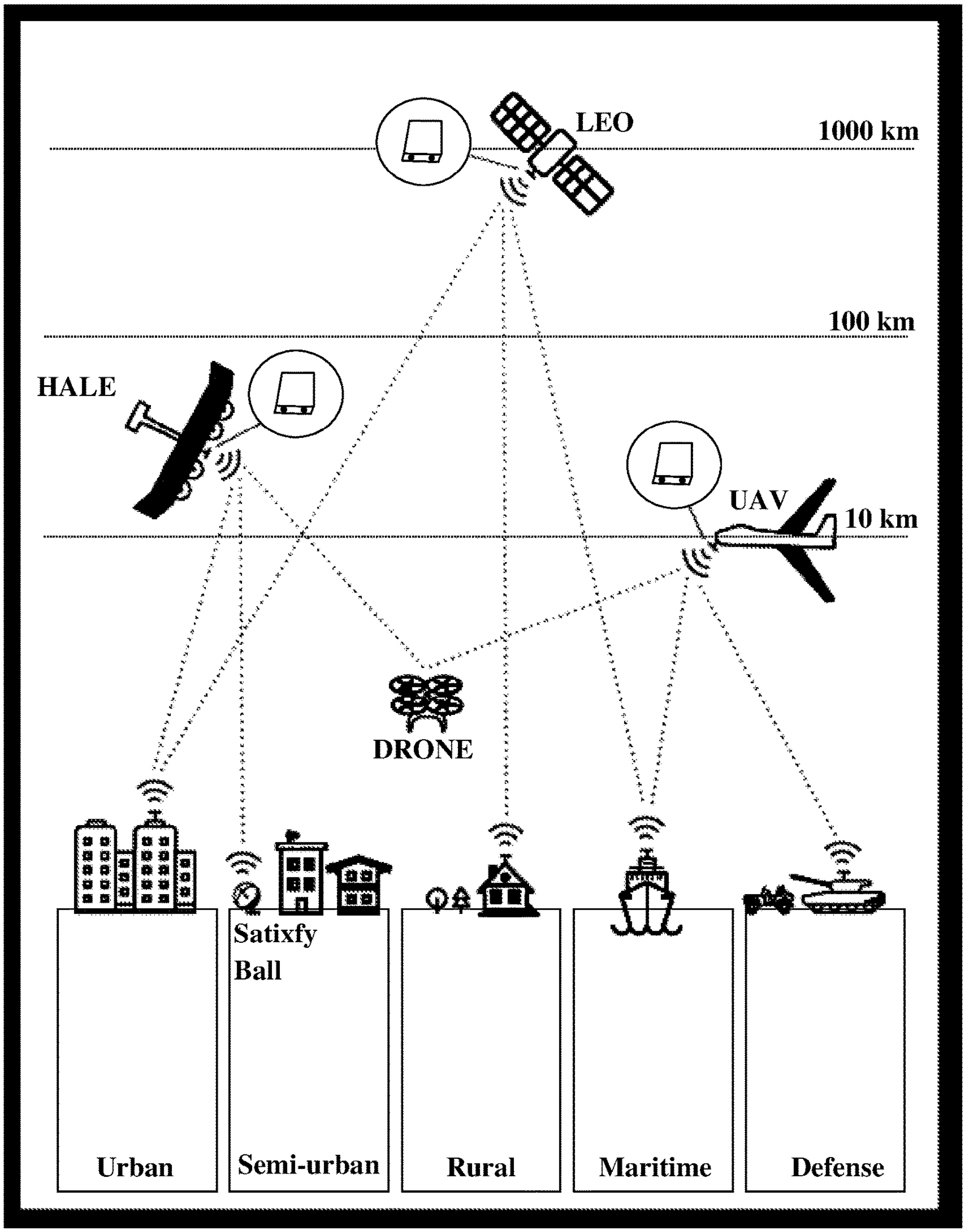
FIG. 10 schematically illustrates communication platforms utilizing the PAA system according to some possible embodiments.
Figure 11:
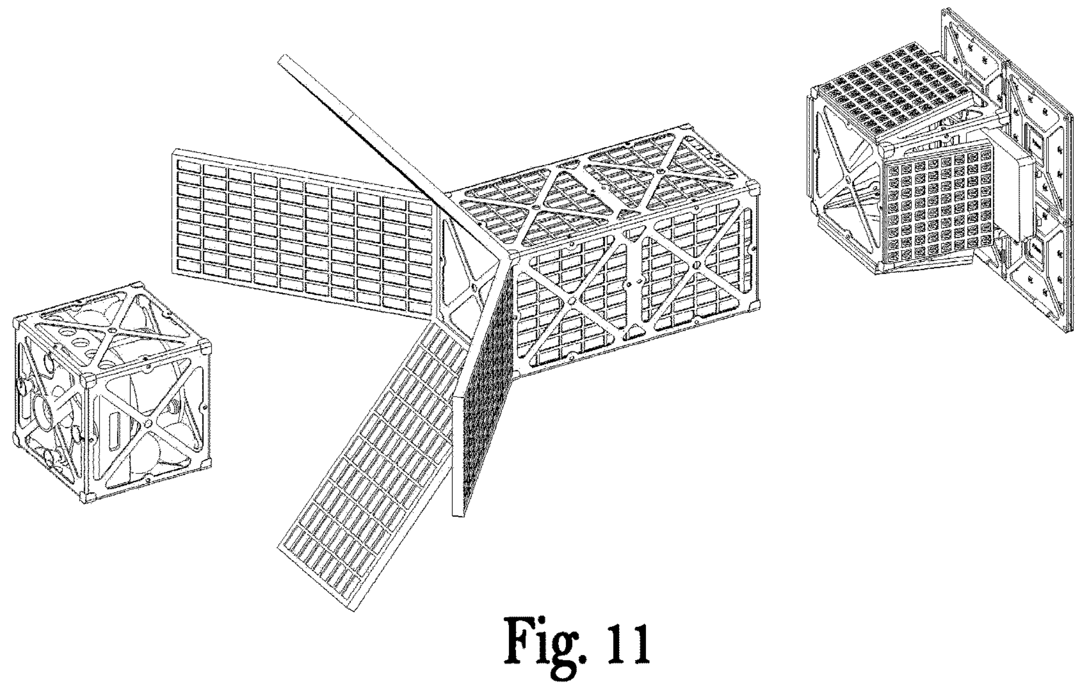
FIGS. 11 and 12 schematically illustrate a full satellite and a communication module in an operating state, according to some possible embodiments, respectively.
Figure 12:
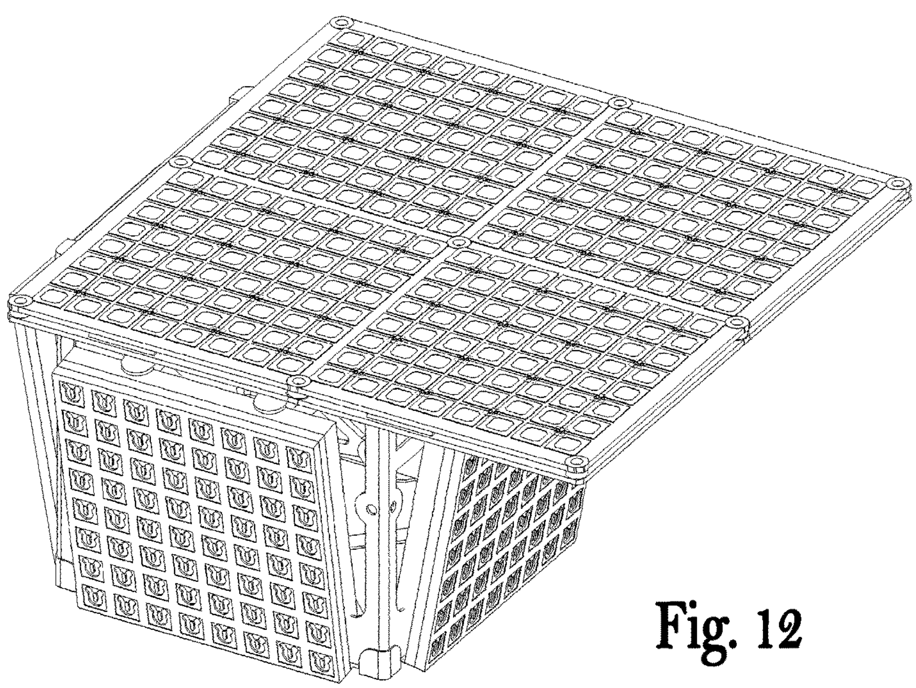

FIG. 10, demonstrates small airborne platforms carrying communication payloads with PAA, where a set of airborne platforms are presented, including Low Earth Orbit (LEO) satellites, High Altitude Long Endurance (HALE) solar aircraft, Unmanned Airborne Vehicle (UAV) and drones. Additionally very small satellites (i.e., "nano-satellites"), which are typically launched to heights between 100 and 1000 km, may also be considered as suitable candidates for this application. FIGS. 11 and 12 demonstrate a schematic view of such a satellite, wherein FIG. 11 demonstrates an example of a full satellite (having 40×10×10 cm dimensions), and FIG. 12 illustrates its communication module in an operating state.

Each of these platforms may be configured to carry a communication payload, serving a large area on the ground. The PAA described above can be scaled according to the required constraints of the platforms in terms of link budget, array physical size, and weight and power consumption. Using a PAA on the payload enables one or more of the following capabilities:

1. Multi-beam
   - A single PAA may illuminate multiple simultaneous beams to increase total throughput;
   - A comprehensive solution combining beamformer, RF and antenna;
2. Beam Hopping
   - Utilizing the payload power amplifiers as much as possible by illuminating the required beam according to the traffic pattern;
   - Using the available frequency spectrum by avoiding simultaneous illumination of neighboring areas, thereby avoiding inter-beam interference and allowing re-use of the same frequency resources for adjacent cell;
3. Low power—The large scale of integration, reduces inherently the power consumption of the antenna array system. Typically, these systems operate at a low duty cycle mode, so when using the appropriate air interface waveform and a modem that supports it, power may be switched off at times where the PAA is not active.
4. Low weight—due to the reduced size (enabled by integration), the total weight of the whole system may be considerably reduced (up to 3 kg for a 256 elements array in Ku band).

All of the above described variations and implementations, as well as any other modifications apparent to one of ordinary skill in the art and useful for operating and calibrating the PAA by the digital beamforming chains of the beamforming chip, may be suitably employed, and are intended to fall within the scope of this disclosure.

It will further be appreciated that embodiments disclosed herein may be realized as computer executable code created using a structured programming language (e.g., C), an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. The processing may be distributed across a number of computerized devices, which may be functionally integrated into a dedicated standalone PAA system. All such permutations and combinations are intended to fall within the scope of the present disclosure.

Those of skill in the art would appreciate that items such as the various illustrative blocks, modules, elements, components, methods, operations, steps, and algorithms described herein may be implemented as hardware or a combination of hardware and computer software. To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In some embodiments features of the PAA system are implemented primarily in hardware using, for example, hardware components such as application specific integrated circuits (ASICs) and/or field-programmable gated arrays (FPGAs). Implementation of the hardware state machine so as to perform the functions described herein will be apparent to persons skilled in the relevant art(s). In yet another embodiment, features of the PAA system can be implemented using a combination of both hardware and software. The software which implements aspects of the PAA system can be stored on a media. The media can be magnetic such as diskette, tape or fixed disk, or optical such as a CD-ROM. Additionally, the software can be supplied via the Internet or some type of private data network.

As described hereinabove and shown in the associated figures, the present application provides techniques for calibrating a PAA system using calibration data generated onsite during on-line operation of the system in one or more digital beamforming stages of the system. While particular embodiments of the invention have been described, it will be understood, however, that the invention is not limited thereto, since modifications may be made by those skilled in the art, particularly in light of the foregoing teachings. As will be appreciated by the skilled person, the invention can be carried out in a great variety of ways, employing more than one technique from those described above, all without exceeding the scope of the claims.

The invention claimed is:

1. A PAA communication system comprising:
- an array of antenna elements;
- at least one digital beamforming circuitry associated with at least one of said antenna elements; and
- a control unit configured and operable to
  - generate on-line signatures responsive to signals received in one or more of said antenna elements during operation of the system, compare said on-line signatures with at least some portion of off-line signatures obtained responsive to signals received in one or more of said antenna elements while the system is under idealized operational conditions, at least one of said on-line and off-line signatures is generated responsive to transmission of one or more predetermined signals from at least one antenna element of said array and receipt of the transmitted signals in at least one other antenna element of said array, generate calibration data based on the comparison between said signatures, and modify parameters of one or more elements in said at least one digital beamforming circuitry based on said calibration data to compensate flaws induced in the system due to artifacts in analog or digital portions of the system.

2. The system of claim 1 comprising at least one memory device for storing the off-line signatures received in one or more of the antenna elements of the system under the idealized operational conditions.

3. The system of claim 2 wherein the control unit is configured and operable to cause transmission of said one or more predetermined signals from the at least one of the antenna elements during the system operation and record the on-line signatures received in one or more of the other antenna elements of the array responsive thereto.

4. The system of claim 1 wherein the on-line signatures are responsive to signals interleaved in a transmission stream of the antenna array during operation of the system without causing interruptions or delays therein.

5. The system of claim 2 wherein the at least one digital beamforming circuitry, the control unit, and the at least one memory device, are implemented in a single integrated circuit configured to transmit a data stream in a form of one or more transmission beams generated via the antenna array.

6. The system of claim 5 wherein the integrated circuit comprises at least one analog signal path configured to intermediate between the at least one digital beamforming circuitry and at least one of the antenna elements.

7. The system of claim 6 comprising a radio frequency front end unit connecting between one or more analog signal paths of the integrated circuit and the at least one of the antenna elements and comprising at least one signal transmit path, at least one signal receive path, and at least one oscillator.

8. The system of claim 7 wherein the at least one signal transmit path comprises a summation unit for summing analog signals outputted by the one or more analog signal paths of the integrated circuit, a frequency mixer for shifting the signal outputted by said summation unit to a frequency from the oscillator, and at least one amplifier for amplifying the signal outputted by said frequency mixer.

9. The system of claim 7 wherein the at least one signal receive path comprises at least one amplifier for amplifying signals received from at least one of the antenna elements, a frequency mixer for shifting the signal outputted by said at least one amplifier to a frequency from the oscillator, and a signal splitting network for delivering the signal outputted by the frequency mixer to one or more of the analog signal paths.

10. The system of claim 1 wherein the at least one digital beamforming circuitry comprises a true time delay unit configured to affect a delay in digital domain to data transmitted using said at least one digital beamforming circuitry.

11. The system of claim 10 wherein the delay affected by the true time delay unit to the data in the digital domain is at least partially based on the calibration data.

12. The system of claim 1 wherein the at least one digital beamforming circuitry comprises a digital predistorter configured to adjust data transmitted using said at least one digital beamforming circuitry to compensate for nonlinearity in amplification stages of the system based at least partially on the calibration data.

13. The system of claim 1 wherein the at least one digital beamforming circuitry comprises a pre-equalizer configured to adjust data transmitted using said at least one digital beamforming circuitry to correct non-flat frequency response of an analog channel associated with said at least one digital beamforming circuitry based at least partially on the calibration data.

14. The system of claim 1 wherein the at least one digital beamforming circuitry comprises an I/Q compensator configured to adjust data transmitted using said at least one digital beamforming circuitry to correct I/Q distortions based at least partially on the calibration data.

15. The system of claim 1 wherein the control unit is configured and operable to modify the parameters of one or more of the elements of the at least one digital beamforming circuitry based on the calibration data to compensate at least one of mutual coupling between the antenna element and non-uniform frequency response of said antenna elements.

16. A method of calibrating communication conducted by an antenna array, the method comprising:

generating off-line signatures based on signals received by at least one antenna element of said antenna array under idealized operational conditions responsive to a calibration sequence transmitted by at least one other antenna element of said antenna array under said idealized operational conditions;

generating on-line signatures based on signals received by said at least one antenna element in an operational state of the array responsive to transmission of said calibration sequence by said at least one other antenna element in said operational state; and comparing the off-line signatures obtained under said idealized conditions and the on-line signatures obtained in said operational state, and generating calibration data to calibrate said communication.

17. The method of claim 16 comprising interleaving the transmission of the calibration sequence in the operational state in transmission stream communicated via the antenna array during regular operation thereof.

18. The method of claim 16 comprising using a digital beamforming process to manipulate stream of data to be communicated via the antenna array, and using the generated calibration data to adjust said data stream in order to correct errors induced in signals communicated via said antenna array.

19. The method of claim 18 wherein the digital beamforming process comprises a true time delay process configured to affect a delay to the data stream in digital domain at least partially based on the calibration data for causing a delay in respective analog signals communicated via the antenna array.

20. The method of claim 18 wherein the digital beamforming process comprises a complex gain process configured to affect a gain and phase shift to the data stream in the digital domain at least partially based on the calibration data for causing a gain and phase shift in respective analog signals communicated via the antenna array.

21. The method of claim 18 wherein the digital beamforming process comprises a digital predistorter process configured to adjust the data steam based at least partially on the calibration data in order to compensate for nonlinearity in amplification stages used by the antenna array.

22. The method of claim 18 wherein the digital beamforming process comprises a pre-equalizing process configured to adjust the data stream based at least partially on the calibration data to correct non-flat frequency response of at least one analog channel associated with the antenna array.

23. The method of claim 18 wherein the digital beamforming process comprises an I/Q compensation process configured to adjust the data stream based at least partially on the calibration data in order to correct I/Q distortions of signals communicated via the antenna array.

24. The method of claim 16 comprising storing the signatures obtained under the idealized operational conditions in a memory device, periodically or intermittently transmitting the calibration sequence in operational states of the array, and generating the corresponding calibration data to calibrate the communication in a self-calibration manner.

25. A non-transitory machine readable medium storing instructions executable by a processor for carrying out the method of claim 16.

26. A communication system configured to communicate data streams by one or more beams via an antenna array, wherein said system is configured for self-calibrating communication paths thereof, the system comprising:

a control unit configured and operable to stream a calibration sequence for transmission by one antenna element of said antenna array and obtain a signature responsively received in at least one other antenna element of the array, compare the obtained signature to one or more off-line signatures similarly obtained by the system, and generate calibration data based on said comparison; and a digital beamforming unit configured to use said calibration data in manipulations applied to said data streams in digital domain for forming said one or more beams and correcting distortions caused by the communication paths of said system.

27. The system of claim 26 wherein the control unit is configured and operable to interleave the calibration sequence in the communicated streams without causing interruptions or delays therein.

28. The system of claim 26 wherein the digital beamforming unit comprises at least one of the following:

a complex gain multiplier configured to affect relative phase shift and gain of the data stream, in the digital domain at least partially based on the calibration data;

a true time delay unit configured to affect a delay to the data stream in the digital domain at least partially based on the calibration data;

a digital predistorter configured to adjust the data stream to compensate for nonlinearity in amplification stages of the system based at least partially on the calibration data;

a pre-equalizer configured to adjust the data stream to correct non-flat frequency response of an analog channel associated with said digital beamforming circuitry based at least partially on the calibration data; and/or an I/Q compensator configured to adjust the data stream to correct I/Q distortions based at least partially on the calibration data.

* * * * *